Oct. 24, 1950 J. W. DONAHEY 2,527,357
FLAG AND FLAGSTAFF ASSEMBLY WITH AIR DEFLECTOR
Filed March 26, 1948 3 Sheets-Sheet 1
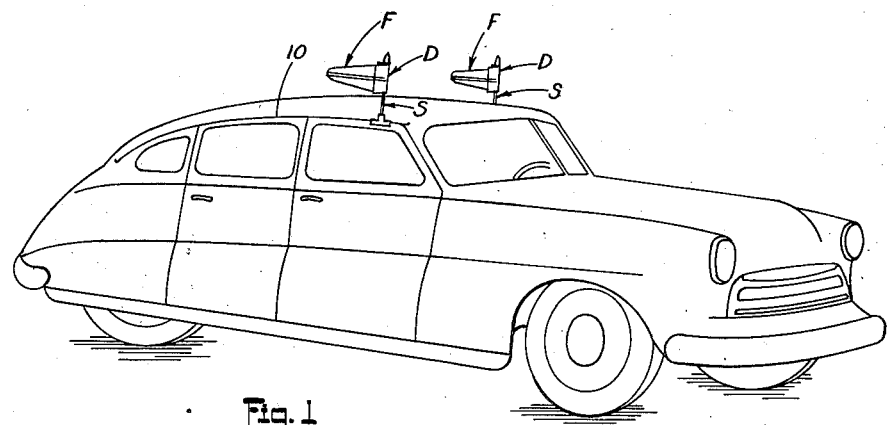
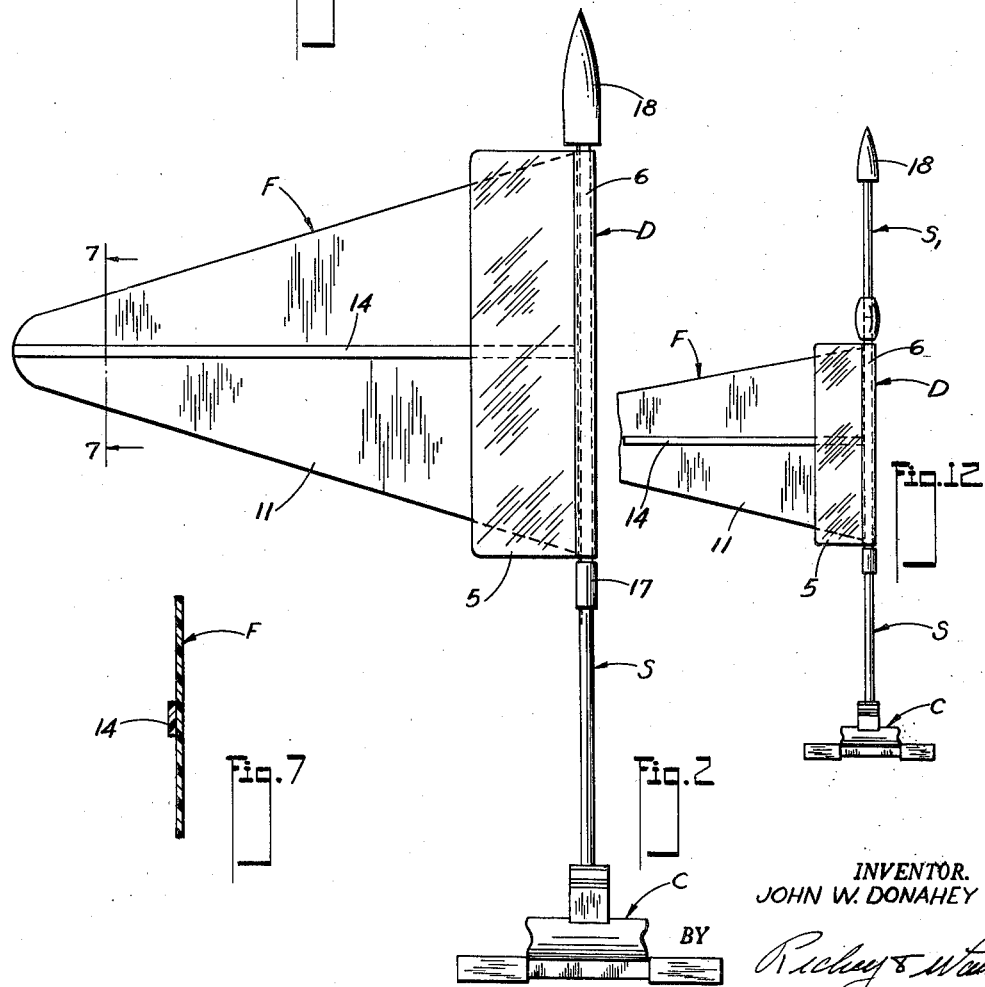
INVENTOR.
JOHN W. DONAHEY
BY
ATTORNEYS Oct. 24, 1950     J. W. DONAHEY     2,527,357
FLAG AND FLAGSTAFF ASSEMBLY WITH AIR DEFLECTOR
Filed March 26, 1948     3 Sheets-Sheet 2
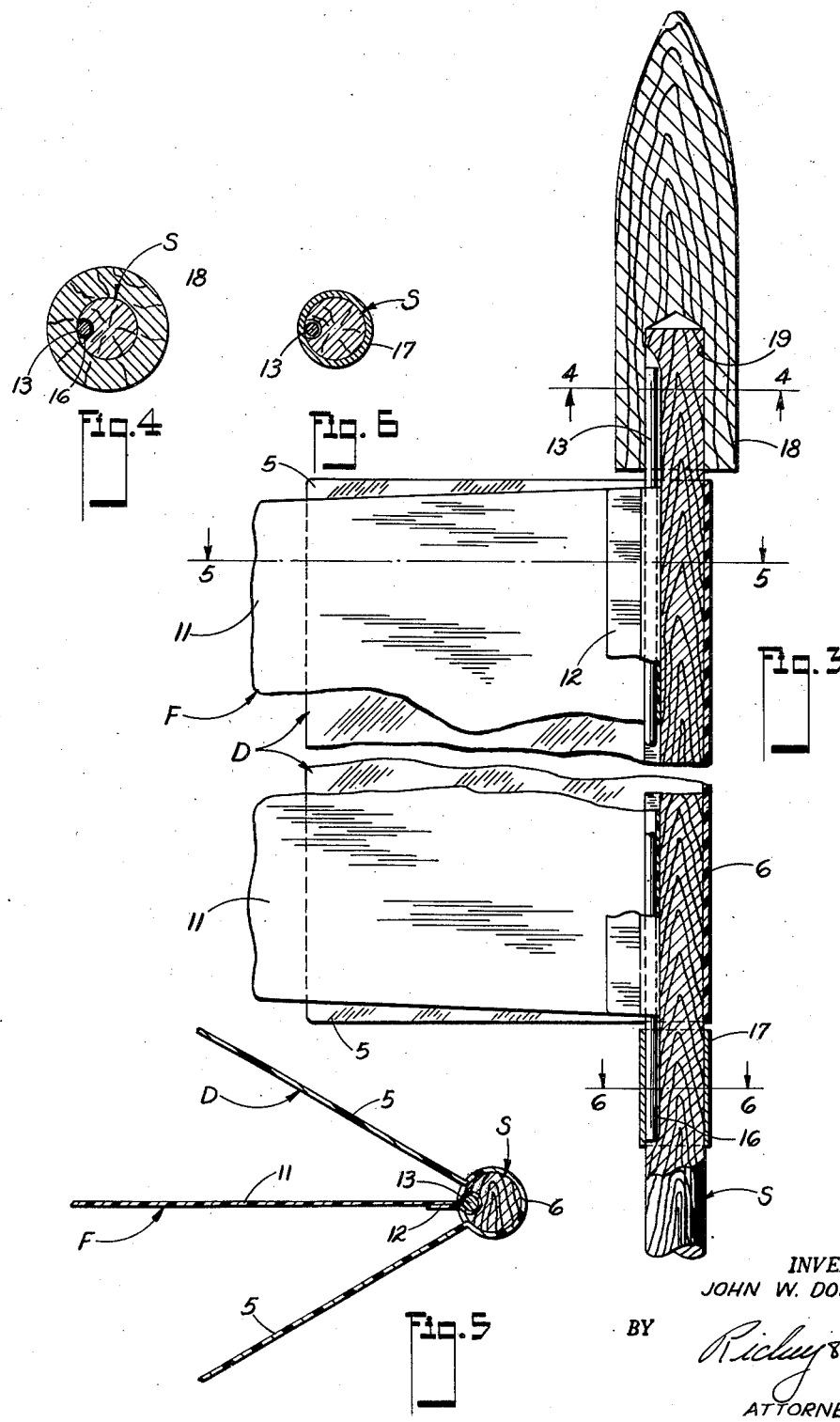
INVENTOR.
JOHN W. DONAHEY
BY
*Richey & Watts.*
ATTORNEYS

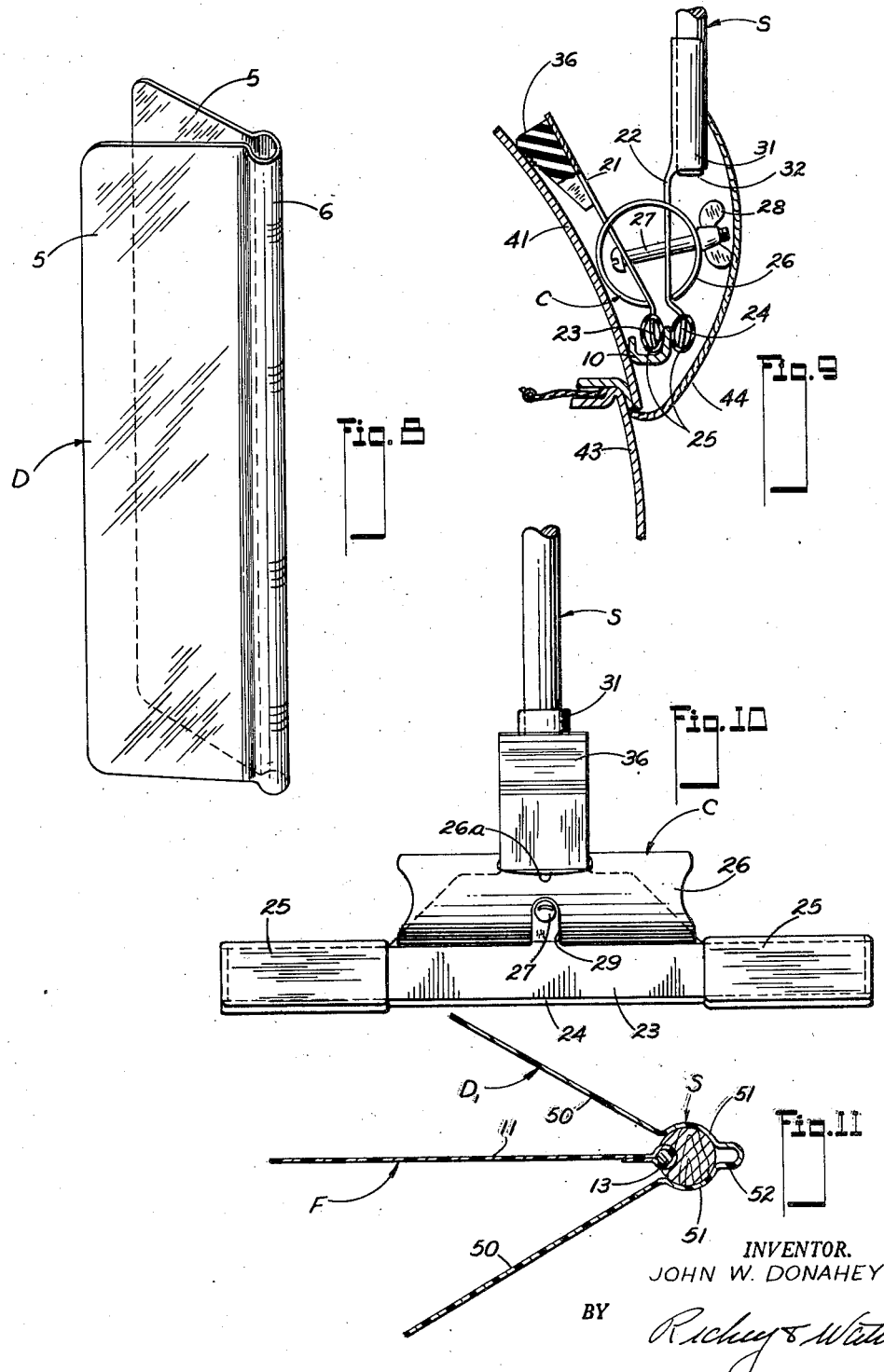

Patented Oct. 24, 1950

2,527,357

UNITED STATES PATENT OFFICE 2,527,357

FLAG AND FLAGSTAFF ASSEMBLY WITH AIR DEFLECTOR

John W. Donahey, Hudson, Ohio

Application March 26, 1948, Serial No. 17,277

6 Claims. (Cl. 116—173)

This invention relates to flags and, more particularly, to miniature flag and flagstaff assemblies of the type commonly mounted on land vehicles, boats or the like.

For example, it is customary to mount miniature identifying flags on vehicles that form parades, funeral processions, etc., and such flags are also used on patriotic occasions, special events, and for pure ornamentation and decoration. Prior flag and flagstaff assemblies provided for this purpose have been open to many objections. With prior devices, the apparent wind resulting from motion of the vehicle causes violent whipping and weaving of the flag so that friction and wear of the flag material or its fibers has been excessive. As a result, life of the flag material has been short, a relatively few miles of travel often being enough to render the flag useless or its fabric tattered.

It is a principal object of the present invention to increase the life of the flag material. In a preferred embodiment, this is accomplished by mounting a transparent wind-deflecting blade to each side of the flag and adjacent the flagstaff. These blades are preferably vertically coextensive with the flag, extend along the flag for a fraction of its length, and diverge from the flag, forming a V in section. By mounting the assembly so that the blades trail relative to the apparent wind due to vehicle motion, I have found that an air stream is produced which smooths the flag and so materially reduces weaving and whipping thereof. As a result, flag life is increased unexpectedly, as compared with flags undergoing similar service without benefit of the air-deflecting blades. For example, I have found that a flag may be carried on a vehicle for a distance of one hundred or more miles at high speeds without damage, if prepared and mounted in accordance with my invention.

Another difficulty with prior devices resides in the mountings. Bumper and fender mountings are not only vulnerable, but do not attract sufficient attention. Window-mounted flags are more visible but are expensive. A further object of this invention resides in the provision of maximum visibility by a mounting that is steady and dependable. This is accomplished by mounting a flag assembly in what is known as the "rain gutter" for the roof of an automobile body, a mounting that affords maximum visibility. According to my invention the various elements of the assembly, including the air-deflecting blades, cooperate to provide a secure and steady mounting in the aforesaid location.

The nature of the mounting employed in the preferred embodiment of my invention may be briefly described as follows: I provide a spring clip with jaws that extend longitudinally along the rain gutter of the vehicle, which jaws are spring urged to clamp the flange thereof laterally. By properly orienting the air-deflecting blades with the vehicle, lateral forces due to whipping and weaving of the flag are so reduced that tendency of air pressure to lay the flagstaff over laterally is largely eliminated. Thus, although with a clip mounting such as described for my preferred embodiment resistance to lateral forces is inherently less than resistance to longitudinal forces, still the clip will remain firmly in place and is readily manipulated for attachment and removal.

To further insure security of the mounting, means in the form of a rod supports the flag on the flagstaff, which permits the flag to center itself between the air-deflecting blades so that once said blades are properly oriented with respect to the vehicle, the flag will fly true between the blades and so exert little lateral force on the clip mounting. In addition to assuring a steady mounting by providing for centering of the flag within the air-deflecting blades, the rod mounting referred to permits ready replacement or changing of flag, the rod being retained in place by an ornamental cap member. The cap member that secures the rod is readily replaced by an extension member that gives the flag an appearance of being at half mast.

Although air-deflecting blades made in accordance with the principles of my invention greatly increase the life of conventional fabric flags, I have found that when used in connection with flags made of plastic material (such as the vinyl resins for example) an unexpected increase in life of the flag material is obtained, and furthermore, the sealing of a narrow band of plastic material along one side of the flag has been found to increase life of the flag much more than would be expected from the small size and great flexibility of the narrow band of material. Accordingly, it is a feature of my invention that in the preferred form, the flag is made of plastic material that has at least one relatively narrow longitudinal band of the same material joined or sealed thereto.

Other objects and advantages of my invention are, the elimination of any danger of scratching the finish of the vehicle body; the insurance of correct vertical alignment of the flagstaff by forming the mounting clip with angular finger grips, one of which is protected by a covering of rubber or the like for bearing against the vehicle body; insuring the mounting means cannot be torn loose by fitting it with an auxiliary screw clamp; and, preventing loss of the entire assembly should the clamp be pulled loose from its mounting by attaching a line to the assembly which hangs down and is caught in the vehicle door when the latter is closed.

One manner in which the aforesaid objects, features, and advantages of the invention may be attained will be apparent from the following detailed description of a preferred embodiment thereof.

In the drawings:

Fig. 1 shows a pair of flags made in accordance with the invention mounted on the rain gutter of an automobile;

Fig. 2 is a side view of the preferred flag and staff assembly;

Fig. 3 is an enlarged fragmentary section through the upper portion of the assembly;

Fig. 4 is a section taken on 4—4 of Fig. 3;

Fig. 5 is a section taken on 5—5 of Fig. 3;

Fig. 6 is a section taken on 6—6 of Fig. 3;

Fig. 7 is a section taken on 7—7 of Fig. 2;

Fig. 8 is a perspective view of a preferred form of deflecting blade unit;

Fig. 9 is an end view of the mounting clip showing how it mounts on the rain gutter of a vehicle;

Fig. 10 is a side view of the mounting clip;

Fig. 11 is a section similar to Fig. 5 showing a modified form of air deflector; and Fig. 12 shows the half-mast flag attachment device in place.

Fig. 1 shows a pair of flags made in accordance with the invention mounted on the rain gutters 10 of a passenger automobile. As seen in the figures, each flag assembly comprises several major units, namely the flag F, air-deflecting blades D, flagstaff S and mounting clip C.

The air-deflecting blade unit D is preferably formed of a pair of transparent plastic air-deflecting blades 5 joined in the form of the V by a partial sleeve member 6. The arrangement is such in the preferred form that the sleeve portion 6 may be snapped over staff S with a blade 5 disposed to each side of the flag.

The flag F is preferably made of a sheet of flexible, plastic material 11, such as one of the polyvinyl resins or the like, although it is understood that the life of ordinary woven fabric flags is greatly increased by the invention. The base of the flag is doubled upon itself as at 12 and bonded or secured to the main sheet 11 to form a seam through which may be inserted a metal flag mounting rod 13. I have found that if a narrow band 14 is bonded or otherwise fastened to the flag material, the life of the flag material can be increased by an extent greater than would be expected from the nature and physical dimension of the band.

I have found that the longitudinal extent of the air-deflecting blades along the flag may be considerably less than the longitudinal extent of the flag itself. For example, a blade assembly will function satisfactorily if it extends along the flag for approximately one-fourth the longitudinal extent of the flag. Of course, the deflector is relatively rigid as compared to the flag in order that the deflector will not collapse in use and may so act as a deflector to increase the life of the flag.

In order to provide a flag mounting that facilitates self-centering of the flag between air-deflecting blades 5, a vertical groove 16 is formed in staff S for reception of the assembled rod 13 and flag. A metal band 17 may be fitted to retain the lower end of rod 13, whereas the upper end of rod 13 is retained by an ornamental cap 18 which is bored as at 19 to slip over the assembled staff and rod.

In order to mount the flag structure just described on a vehicle with the flag and blades properly aligned with respect to the relative motion of the air stream and the flag engendered by motion of the vehicle, a mounting clip assembly C may be provided. In the preferred embodiment the mounting takes the form of a spring clip having angularly disposed jaws 21 and 22 having lower gripping portions 23 and 24, respectively. The portions 23 and 24 are preferably covered with rubber-like guards 25 to protect the finish of the rain gutter 10 of the vehicle. The lateral spring clamping force is provided by a C-shaped leaf spring 26 apertured as at 26a to receive grip portions of the jaws 21 and 22. In order to augment the lateral force of spring 26, an auxiliary clamp screw 27, and wing nut 28 may be mounted in suitable apertures in the part, including clearance slot 29 in one leg of the C-shaped spring.

So that flagstaff S may be attached to clip assembly C, a metal thimble 31 is bent from the material of clip part 22 to form a socket for reception of the lower portion of staff S. A tongue 32 may be bent over from one wall of thimble 31 to form at bottom platform guide aperture in spring C.

As can be seen best in Fig. 9, when the clip assembly is mounted on rain gutter 10, the roof panel 41 is protected from abrasion by jaw member 21 by means of a soft grip 36, which may be made of any suitable rubber-like material. It is noted that the geometry of the clip and vehicle assembly is such that when mounted on the vehicle, the flagstaff S is carried substantially vertically. As an additional safety feature, I may make fast a line 44 to a convenient portion of the flagstaff or clip. The line falls downwardly under influence of gravity and is pinched between the door 43 and the roof panel as the door is closed, which prevents accidental loss of the entire assembly under influence of an especially violent gust of wind or other external force.

It should be apparent how the various elements thereof of the preferred form of my invention mutually cooperate to produce a novel and improved flag assembly and mounting. The air-deflecting blades, by reducing the lateral forces due to whipping and weaving, not only greatly lengthen the life of the flag material, but stabilize the flagstaff mounting on the vehicle. This action is assured by the rod mounting of the flag on the staff which permits the flag to fly true between the blades, providing the latter are properly oriented on the flagstaff. The spring clip is peculiarly adapted for mounting the assembly on the rain gutter of a vehicle and the jaws that extend along the gutter are well adapted to resist the comparatively steady fore and aft forces of the air stream on the flag. Although the clip jaws are not as powerful in their resistance to lateral forces as they are in resistance to fore and aft forces, yet they are not called upon to resist lateral forces of any magnitude because of the smoothing action of the air-deflecting blades and the self-centering action of the flag mounting previously referred to. Finally, the self-centering rod mounting is retained by an ornamental cap that is readily replaced by an extension cap to simulate a flag flown at half mast.

A modified form of air deflector appears in Fig. 12 wherein blades 50 are joined by arcuate base portions 51 that include a channel portion 52.

The channel increases the flexibility of the deflector mounting and facilitates snapping portions 51 over the flagstaff. The air-deflecting blades are preferably substantially vertically coextensive with the rear or vertical edge of the flag in order to insure operation of the device. Of course, the blades need not be completely coextensive with the flag, they need only have a vertical dimension great enough to produce applicant's new results, but I have found that best operation is had when the aforesaid coextensiveness is substantial. The material of the air deflector must be such that as compared to the flag itself, the deflector is relatively rigid, that is, rigid or inflexible enough to avoid collapse during use and to deflect air from the flag to produce the new results described. Of course, this does not mean that the deflector does not have some flexibility, and in fact in the preferred form a certain resiliency is desirable to permit snapping the deflector over the flagstaff. The term "rigid" or "relatively rigid" as appearing in the claims is intended to mean rigid enough to attain the described mode of operation but not necessarily so rigid as to be virtually inflexible in ordinary use.

Having completed a detailed description of a preferred embodiment of my invention, I contemplate that various changes and modifications thereof may be made without departing from the spirit and mode of operation of my invention. Accordingly, I contemplate that the following claims and not the aforesaid embodiment be determinative of the scope of my invention.

Although my invention is primarily one wherein a flag assembly is mounted on a moving vehicle, the mode of operation would be unchanged if the flag assembly were stationary, and mounted by means whereby the base of the deflecting blades is present toward the direction from which a prevailing wind is blowing. Accordingly, I further contemplate that the mounting on a moving vehicle that creates its own wind, or a stationary mounting properly oriented with respect to the wind, are equivalents in the appended claims.

What is claimed is:

1. A flag assembly for mounting on a vehicle comprising a flagstaff, a flag having a generally vertical edge supported on said staff, and a relatively rigid air-deflecting device comprising a trough-like member formed of a sheet of plastic material and having an apex from which extends a pair of generally diverging blades, the apex of said trough-like member being of cylindrical shape forming a resilient restricted throat that is snapped over said staff, said blades extending forwardly of said vertical edge of the flag to laterally overlie a substantial area of said flag adjacent said staff, said blades being substantially vertically coextensive with said flag at its vertical edge, said blades being constructed to form a directed air stream adjacent the base portion of said flag that reduces lateral whipping of said flag.

2. An air deflector for use with a flag and flagstaff, that produces a directed air flow over a substantial area of the base of the flag comprising a channel-like member formed of a sheet of transparent plastic material and having elongated diverging legs joined at the apex of said member by an integral re-entrant resilient portion forming a restricted throat for resilient mounting on a flagstaff, said legs being adapted to overlie a substantial area of said flag with the blades substantially vertically coextensive with the associated flag, said deflector being relatively rigid to avoid collapse thereof by air resistance encountered in use.

3. An air deflector for use with a flag and flagstaff that produces a directed air flow over a substantial area of the base of the flag comprising a channel-like member formed of a sheet of transparent plastic material and having elongated diverging legs joined at the apex of said member by an integral resilient generally cylindrical portion forming a restricted throat for resiliently embracing a flagstaff, said legs being adapted to overlie a substantial area of said flag with the blades substantially vertically coextensive with the associated flag, said deflector being relatively rigid to avoid collapse thereof by air resistance encountered in use.

4. For use with a miniature flag and flagstaff, an air-deflector for causing an air stream that reduces lateral whipping of said flag, said deflector comprising an elongated, generally V-shaped member of thin plastic material for straddling the flag, the apex of said V-shaped member having means for resilient snapping over a flagstaff, said member being adapted to overlie a substantial area of said flag and to be substantially vertically coextensive therewith, said deflector being relatively rigid to avoid collapse thereof by air resistance encountered in use.

5. For use with a miniature flag and flagstaff, an air-deflector for causing an air stream that reduces lateral whipping of said flag, said deflector comprising a pair of generally diverging elongated blades for disposition on opposite sides of the flag, means joining the nearer edges of said blades comprising a partial cylinder forming a restricted resilient throat for snapping over a flagstaff, said blades being adapted to overlie a substantial area of said flag and to be substantially vertically coextensive therewith, said deflector being relatively rigid to avoid collapse thereof by air resistance encountered in use.

6. In combination, a flag assembly for mounting on a vehicle comprising a flagstaff, a flag, means for mounting a rearward portion of said flag on said flagstaff, and an air-deflecting device mounted on said flagstaff adajcent the rear of said flag; said air-deflecting device comprising a pair of elongated blades of thin sheet material, means for mounting said blades on said flagstaff with said blades extending forwardly from said flagstaff, said blades being laterally divergent from the flagstaff, said blades being disposed to laterally overlie a substantial area of said flag adjacent and forward of said staff, said blades being substantially vertically coextensive with said flag, said blades and the mounting means therefor being sufficiently rigid to form a directed air stream along said flag and so reduce lateral whipping of said flag.

JOHN W. DONAHEY.

REFERENCES CITED

The following references are of record in the file of this patent:

UNITED STATES PATENTS

| Number | Name | Date |
|---|---|---|
| 1,036,168 | Updike | Aug. 20, 1912 |
| 1,122,628 | Myers | Dec. 29, 1914 |
| 1,171,917 | Axford | Feb. 15, 1916 |
| 1,474,102 | Ashmore | Nov. 13, 1923 |
| 2,167,579 | Gardella | July 25, 1939 |
| 2,288,442 | Felton | June 30, 1942 |